United States Patent [19]

Moteki

[11] Patent Number: 4,982,146
[45] Date of Patent: Jan. 1, 1991

[54] STEPPING MOTOR DRIVING DEVICE
[75] Inventor: Eiji Moteki, Kanagawa, Japan
[73] Assignee: Fuji Electric Co., Ltd., Kanagawa, Japan
[21] Appl. No.: 375,960
[22] Filed: Jul. 6, 1989
[30] Foreign Application Priority Data Jul. 19, 1988 [JP] Japan .................................. 63-180044

[51] Int. Cl.⁵ .............................................. H02P 8/00
[52] U.S. Cl. ....................................... 318/696; 318/685
[58] Field of Search ................................ 318/696, 685
[56]      References Cited
U.S. PATENT DOCUMENTS 4,477,757 10/1984 Palombo et al. ..................... 318/696
4,489,259 12/1984 White et al. ......................... 318/696
4,518,904  5/1985 MacLeod et al. .
4,540,927  9/1985 Tanimoto ............................ 318/696
4,555,653 11/1985 Nowata et al. ...................... 318/696

Primary Examiner—William M. Shoop, Jr.
Assistant Examiner—Saul M. Bergmann
Attorney, Agent, or Firm—Finnegan, Henderson, Farabow, Garrett, and Dunner

[57]                ABSTRACT

A schedule driving device drives a polyphase stepping motor via a drive circuit that supplies phase currents to the motor for moving the read/write head of a disk storage device. Phase data provided to the driving circuit is switched with the actual movement of a movable piece of the stepping motor. A position encoder coupled to the motor or a magnetic sensor generates a detection signal representing the position of the movable piece of the stepping motor. A programmed microcomputer then switches the phase data according to timing data stored in the microcomputer memory synchronized with the detection signal.

7 Claims, 3 Drawing Sheets

FIG. 1
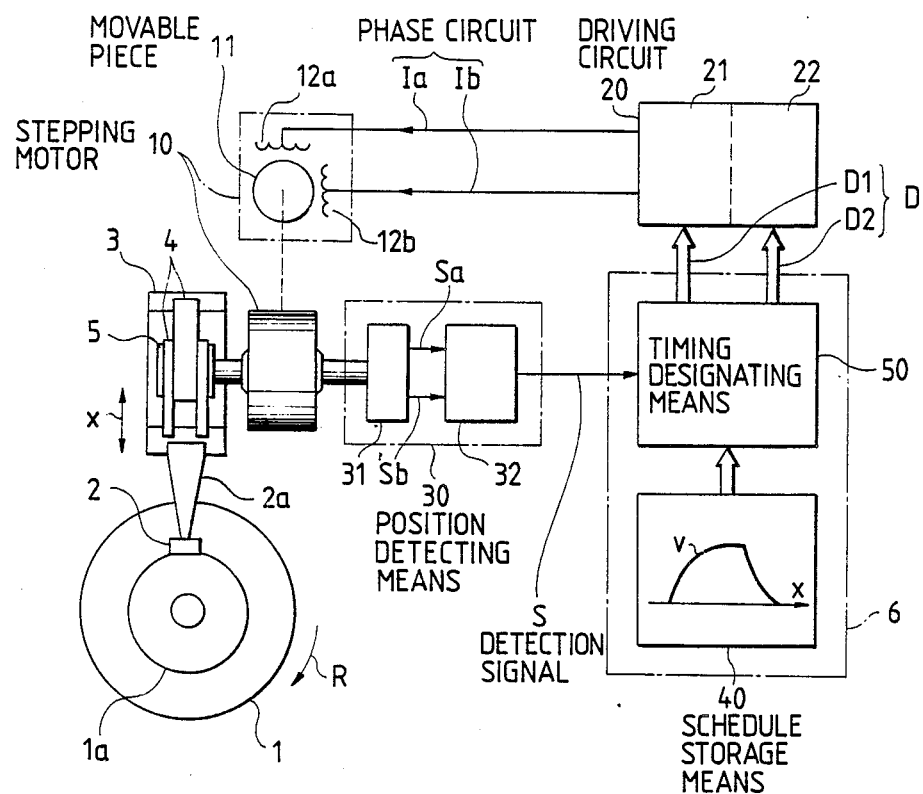
FIG. 2
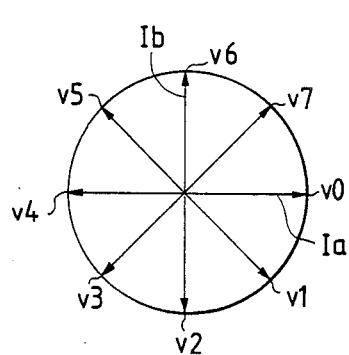
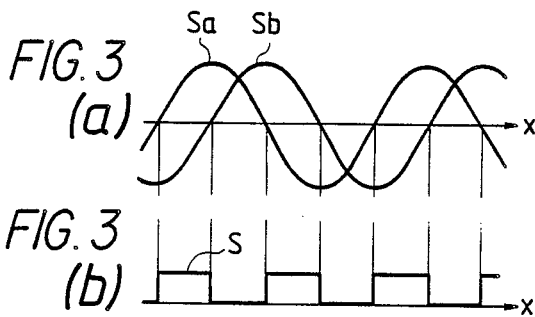
FIG. 3 (a)
FIG. 3 (b)

STEPPING MOTOR DRIVING DEVICE

FIELD OF THE INVENTION

The present invention relates to a driving device for a stepping motor, and more specifically, to a device for driving a polyphase stepping motor such as, for example, a two-phase motor, in accordance with a prescribed time schedule via a drive circuit that supplies phase currents to the motor. The driving device of the invention is particularly suitable for driving a stepping motor for moving a read/write head of a disk storage device.

BACKGROUND OF THE INVENTION

Stepping motors are widely used for moving the read/write head of a disk storage device in which the rotor or a movable piece of the stepping motor is driven one step each time a drive instruction is provided. In that sense, a stepping motor may be regarded as a type of pulse motor, but it is more typically a polyphase motor, ordinarily of two-phase construction. Phase data designating the phase current vectors of the stepping motor are provided to a drive circuit for supplying the respective phase currents to the stepping motor. The phase data is switched to sequentially designate the positions of the rotor or the movable piece, thereby shifting the movable piece by a desired amount or step number.

By providing data designating the phase current vectors of the stepping motor to the drive circuit, it is possible to stop the movable piece of the stepping motor at a desired position. By controlling the timing for switching the phase data to the drive circuit, it is further possible to drive the stepping motor according to a desired schedule.

In order to move the read/write head desired distance within the shortest possible time, the phase data given to the drive circuit of the stepping motor is switched at times so that head speed changes in an approximate form of trapezoid or triangle. For that purpose, the time interval for switching the phase data is progressively shortened during the acceleration period, kept constant during the constant speed period, and progressively prolonged during the deceleration period. The schedules for contracting and expanding the switching interval are usually determined from the number of steps. The time interval between switching can be determined from the desired speed and the time characteristic of the read/write head.

The drive object, such as a read/write head, necessarily has inertia, however, so that when the time for driving the object is reduced below a certain limit, the actual displacement of the object tends to deviate from the driving schedule. In particular, the object may not be brought to a stop until after passing the desired stopping position. The object then oscillates around the desired stopping position. In the stepping motor, the position of the movable piece is designated by the phase data in the drive circuit, so that the movable piece is eventually brought to a stop at the designated phase current position. When the moving piece oscillates around the stopping position, however, additional time is required for the oscillation to subside.

Various techniques have been used to damp this oscillation. For example, so-called "anti-phase damping" is one such technique. When the object approaches the final stopping position, the phase data given to the drive circuit of the stepping motor is not switched to the phase data designating the stopping position, but instead is switched to a phase data that is two or three steps previous in order to apply a damping force to the object. The phase data is reswitched to the normal phase data at an appropriate time. Although this technique can be quite effective, getting the timing right for the "anti-phase" switching and the timing for reinstating the normal phase data is difficult, as one can easily imagine. Furthermore, the timing will vary with the conditions such as the driving distance which may actually encourage the oscillation.

SUMMARY OF THE INVENTION

It is, therefore, an object of the present invention to provide a driving device for driving a stepping motor in which the actual displacement of the drive object deviates very little from a prescribed drive schedule.

It is a further object of the present invention to provide a driving device for driving a stepping motor that enables the drive object to be brought to a stop at a desired position in a short time without oscillation.

Additional objects and advantages of the invention will be set forth in part in the description that follows, and in part will be obvious from the description, or may be learned by practice of the invention. The goals and advantages of the invention will be realized and obtained by means of the elements and combinations particularly pointed out in the appended claims.

To achieve these objects and in accordance with the purpose of the invention, as embodied and broadly described herein, a driving device for driving a polyphase stepping motor via a drive circuit that supplies a plurality of phase currents to the stepping motor comprises: position detecting means for generating a detection signal representing the position of a movable piece of the stepping motor that corresponds to a reference vector on a vector diagram formed by a plurality of phase currents of the stepping motor; schedule storage means for storing the drive schedule in the form of timing data for switching the phase currents for each position of the movable piece corresponding to the detection signal of the position detecting means; and timing designating means responsive to the detection signal for causing the drive circuit to switch the phase currents supplied to the stepping motor to the drive circuit according to the timing data stored in the schedule storage means.

According to one embodiment of the invention, the position detecting means includes an encoder mechanically coupled to the movable piece of the stepping motor. In order to avoid having to adjust the angle of mechanical coupling and the like, however, in a preferred embodiment of the invention, the position detecting means includes sensor means for detecting the magnetic pole position of the movable piece of the stepping motor.

Furthermore, the timing designating means preferably includes a programmed microcomputer. It is, therefore, desirable for the position detecting means to generate a pulse-type detection signal indicating the position of the movable piece for synchronizing with the timing designating means.

Because of the inertia of the object driven by the stepping motor, the actual position of the movable piece of the stepping motor tends to lag behind the scheduled position during acceleration of the drive object and tends to lead during deceleration. For these reasons, the timing designating means preferably outputs to the drive circuit phase data which is the phase differences or the time differences for the positions of the movable piece to correspond to the reference vectors of the stepping motor represented by detection signals from the position detecting means. It is advantageous to set these time differences corresponding to the inertia of the drive object so as to advance the position of the movable piece during acceleration and delay it on the contrary during deceleration. It is also possible, depending upon the need, to promote acceleration by advancing the phase data beyond the normal schedule during acceleration, and to promote deceleration by delaying the phase data behind the normal schedule during deceleration.

In order to drive an object according to a schedule with a stepping motor, even when the switching time interval of the original phase data is narrowed considerably, the movable piece must move to the position corresponding to the designated phase current vector each time the phase data is switched. If the timing for switching the phase data is inappropriate, however, the deviation between the actual movement of the movable piece and the schedule is amplified every time the phase data is switched. Eventually, the device will reach a state in which the movable piece cannot be brought to a smooth stop at a desired position. Given this fact, in the present invention, the switching of the phase data is synchronized with the detection signal from the position detecting means. Thus, the difference between the actual movement of the movable piece and the schedule can be attenuated and the object can be stopped smoothly at a desired position without overshooting or oscillation by switching the phase data with the actual movement of the movable piece.

In order to synchronize the switching time of the phase data with the actual movement of the movable piece, in the present invention, a position detecting means generates a detection signal which represents the position of the movable piece that corresponds to a reference vector in a vector diagram formed by a plurality of phase currents of the stepping motor. The timing for switching the phase data is set with reference to each position of the movable piece represented by the detection signal. The timing data is not only aimed at setting the switching time interval, but is also set to accelerate or decelerate the movable piece according to the drive schedule.

Therefore, even though the phase data is switched based on the drive schedule, it is also switched in accordance with the actual movement of the movable piece, so that the deviation of the movable piece from the schedule is much less than in the prior art, making it possible to stop the movable piece at a desired position.

The accompanying drawings, which are incorporated in and constitute a part of the specification, illustrate several embodiments of the invention and together with the general description, serve to explain the principles of the invention.

BRIEF DESCRIPTION OF THE DRAWINGS

FIG. 1 is a block diagram showing an embodiment of the present invention in which the driving device of the stepping motor is applied to drive the read/write head of a disk storage device;

FIG. 2 is phase current vector diagram showing the reference vectors of the stepping motor;

FIGS. 3a and 3b are waveform diagrams of detection signals generated by the position detecting means;

DESCRIPTION OF THE PREFERRED EMBODIMENT

Figures 4, 5:
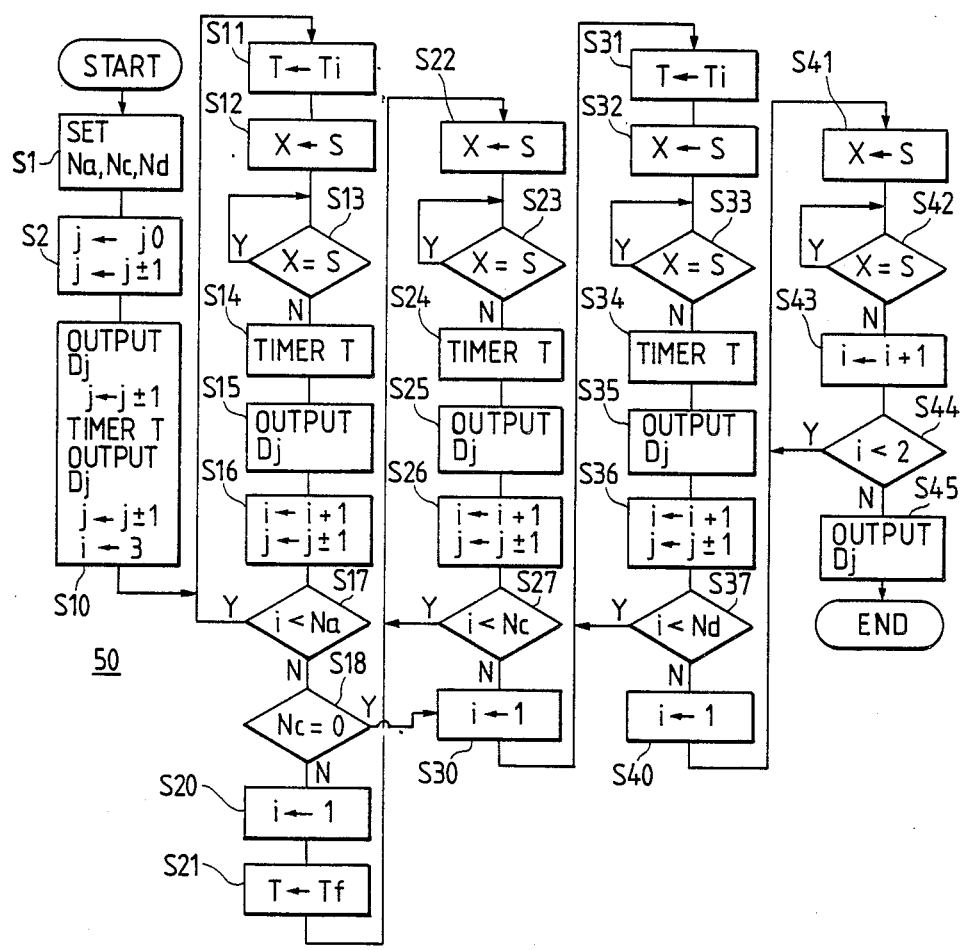
FIG. 4 is a schedule diagram illustrating a driving schedule.
FIG. 5 is a flow diagram illustrating the operation of the timing designating means.

Reference will now be made in detail to the presently preferred embodiment of the invention, an example of which is illustrated in the accompanying drawings. FIG. 1 is an example of the schedule driving device for a stepping motor in accordance with the present invention for driving the read/write head of a disk storage device.

In FIG. 1, a read/write head 2 for reading data from or writing data to a track 1a of a disk 1, which is rotated in the direction of the arrow R, is carried by a carriage 3 via arm 2a. The carriage 3 and a capstan 5 fitted to a shaft of a stepping motor 10 are mechanically coupled via a thin metallic band 4 wound around the capstan 5, with both ends of the metallic band 4 fixed to the carriage 3. Accordingly, the read/write head 2 is moved together with the carriage 3 in the radial direction x of the disk 1 in response to the rotation of the stepping motor 10. The stepping motor 10 is a two-phase motor having a movable piece 11 and two phase coils 12a and 12b.

Phase currents $Ia$ and $Ib$ that flow in the two phase coils 12a and 12b of the stepping motor 10 are supplied by a drive circuit 20. A vector diagram formed by the two phase currents $Ia$ and $Ib$ is shown in FIG. 2. As shown, the two phase currents $Ia$ and $Ib$ have an electrical phase difference of 90°, and in this example are represented by eight reference vectors $v0$ to $v7$. By feeding a combination current of phase currents corresponding to one of these reference vectors in the phase coils 12a and 12b of the stepping motor 10, it is possible to place the movable piece 11 at a position corresponding to the reference vector.

The drive circuit 20 is divided into a current switching part 21 and a current adjusting part 22. Switching part 21 is a changeover switch that turns the phase currents $Ia$ and $Ib$ on and off and switches their positive and negative directions. Current adjusting part 22 is a circuit that adjusts the phase current values according to, for example, the PWM system. Phase data D is provided to the drive circuit 20 for specifying the combination of the phase currents corresponding to one of the reference vectors $v0$ to $v7$ in FIG. 2. Phase data D is, for example, a binary digital number of eight bits. Four bits (D1) designating the polarity and four bits (D2) designating the current value are provided to the current switching part 21 and the current adjusting part 22, respectively.

The position detecting means 30 of the present embodiment includes a two-phase rotary encoder 31 that is mechanically coupled to the movable piece or the shaft of the stepping motor 10, and a digitization circuit 32 for converting two-phase position detection signals $Sa$ and $Sb$ received from the encoder 31 to a pulse-type detection signal S. The waveforms of position signals $Sa$ and $Sb$ and detection signal S are shown in FIGS. 3(a) and (b). As shown in FIG. 3(a), the position signals Sa and Sb from the encoder 31 have waveforms which vary sinusoidally with respect to the position of the movable piece of the stepping motor, that is, the position x of the head 2. The digitization circuit 32 converts these signals to a detection signal S which changes state at zero cross points of these two signals as shown in FIG. 3(b). Alternatively, instead of connecting the stepping motor to the encoder 31, the magnetic pole of the movable piece may be detected, for example, by incorporating a magnetic sensor in the stepping motor.

A microcomputer 6 is incorporated in the device for overall control of the disk storage device Schedule storage means 40 and timing designating means 50 of the present invention are also built into the device. The schedule storage means 40 is a storage area in a ROM or RAM of the microcomputer 6 which stores timing data based on a driving schedule as shown within the frame, while the timing designating means 50 resides in software incorporated in the microcomputer 6.

FIG. 4 shows an example of a drive schedule in which the abscissa is the position x of the head and the ordinate is the speed v of the head. The drive period is divided into an acceleration period Ta, a constant speed period Tc and a deceleration period Td. In schedule A in FIG. 4, all of these periods are included In schedule B deceleration begins as soon as the head speed reaches a maximum speed, and in schedule C, deceleration starts even before the head speed reaches the maximum speed so that a constant speed period Tc does not appear in schedules B and C. The numbers of steps or changes in the phase data in the acceleration period Ta, constant speed period Tc, and decelerating period Td are represented by Na, Nc, and Nd, respectively. In schedules B and C, the number of steps Nc of the constant speed period is zero. There is also shown in FIG. 4 a stop operation period Ts for bringing the head to a complete stop, in addition to the three periods mentioned above.

Figure 6:
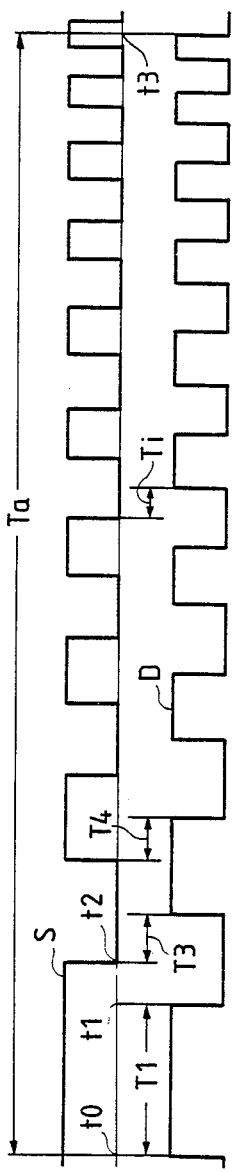
FIG. 6 shows waveform charts of the detection signal illustrating the operation of the drive schedule and a state change diagram of the phase data which designates the phase current vector.
Figure 6:
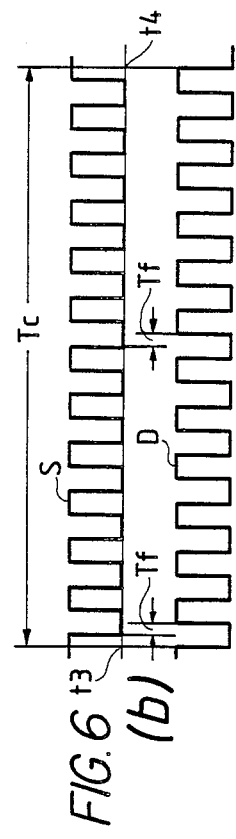
Figure 6:
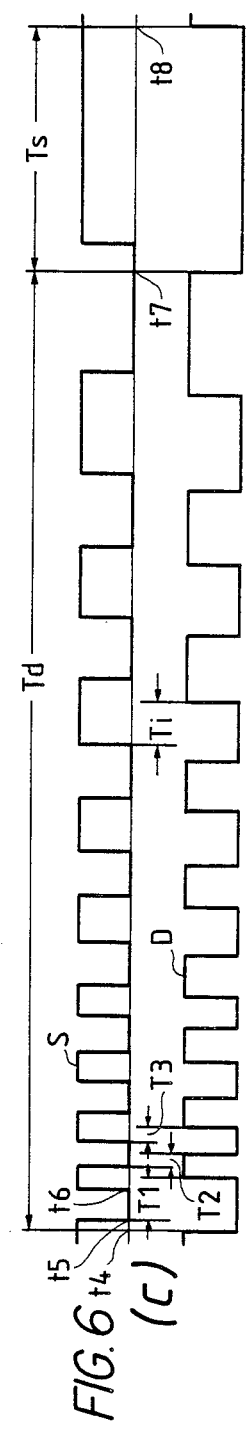

The procedure for setting the timing data in the schedule storage means 4 based on such a drive schedule will be described with reference to FIGS. 6(a) through 6(c). FIGS. 6(a), 6(b) and 6(c) correspond to the acceleration period Ta, the constant speed period Tc, and the deceleration period Td, respectively, in which each of the upper graphs represents the detection signal S and the lower graphs represent the phase data D. The phase data D is a digital number of eight bits, for example, as mentioned earlier, but it is represented for convenience in FIG. 6 by an upper and a lower line in order to show schematically the state of switching. Specifically referring to FIG. 6(a), the phase data D is switched at time T3 after the detection signal S has fallen from a high level to a low level state. Similarly, at time T4 after the detection signal S rises from a low level to a high level, the phase data D is switched again.

The timing data stored in the schedule storage means 40 are such times as T3 and T4 which are stored for the phase data of every step mentioned above. During the acceleration period Ta, the timing data Ti (i=1 to Na) is set to decrease with time as shown in FIG. 6(a). During the constant speed period Tc, the timing data Tf is set to a constant value as shown in FIG. 6(b), and during the deceleration period Td, the timing data Ti (i=1 to Nd) is set to increase with time as shown in FIG. 6(c).

The overall operation of the schedule driving device will now be described with reference to FIG. 5 and FIG. 6. FIG. 5 is a flow chart showing the operational steps of the timing designating means 50. In FIG. 5 the operational steps within the acceleration period Ta, the constant speed period Tc the deceleration period Td, and the stop operation period Ts are shown by steps S10–S18 steps S20–S27, steps S30–S37, and steps S40–S45, respectively.

The initial steps S1 and S2 in FIG. 5 are preparatory steps. Step S1 sets the number of steps Na, Nc, and Nd for the acceleration, constant speed, and deceleration periods, respectively, based on a drive schedule such as that shown in FIG. 4. In a disk storage device, the reference vector number j0 to the stepping motor 10 corresponding to the current position of the read/write head is always stored in microcomputer 6. Therefore, in the next step S2, after entering the current vector number j0 in the variable j representing the phase data number designating the reference vector, one is added to or subtracted from the variable j according to the direction in which the read/write head is to be operated. In either case, this corresponds to advancing the phase data number by one in the direction for operating the read/write head. In the present embodiment, the number of reference vectors of the stepping motor is eight from v0 to v7 as shown in FIG. 2, so that the variable j is a 3-bit digital number.

In the first step S10 in the acceleration period Ta, the phase data Dj corresponding to phase data number j is output to the drive circuit 20. Since the phase data number j has already been advanced in the previous step S2, the stepping motor 10 is started immediately. Next, the phase data number j is again advanced by one. The sequence of operation may then be shifted to step S11. In this particular embodiment, however, a timer operation with time interval Tl is executed in step S10 to output the phase data Dj after elapse of that time interval. Then, the phase data number j is further advanced by one. Since the phase data has been outputed twice by that time, the operation of step S10 is completed by setting step number i to three, and then proceeding to step S11. The time interval Tl may be conveniently stored in the schedule storage means 40 as timing data which is read out by the timing designating means 50.

Referring to FIG. 6(a), after the first phase data D1 is outputed at time t0, the value of the time interval Tl is set so as to complete the timer operation at time t1 before detection signal S changes its state at time t2. At time t1, the second phase data D2 is outputed. In other words, the phase data is switched so that in effect phase data which is two steps ahead of the phase data corresponding to the current position of the read/ write head is provided to the drive circuit. Since the head tends to lag behind the scheduled acceleration, acceleration of the head is promoted in this embodiment by advancing the phase current vector given to the stepping motor beyond the next value.

In step S11, timing data Ti corresponding to step number i is read from the schedule storage means 40 and entered in the time interval T. In the next step S12, the state of the detection signal S is read and entered in the variable X. The ensuing step S13 is a waiting step that waits for a change in the state of the detection signal. When the state of the detection signal S is changed from a high level to a low level or from a low level to a high level as a result of rotation of the movable piece of the stepping motor, the sequence of operation proceeds to the next step S14 and restarts the timer operation with time interval T as set earlier in step S11. After elapse of time interval T, the phase data is switched by outputting the j-th phase data Dj in step S15, continuing the acceleration of the stepping motor.

In the next step S16, both the step number i and the phase data number j are advanced by one each. Step S17 determines whether the step number i has reached the number of steps Na in the acceleration period. If it has not reached the number of steps Na, control is returned to step S11 to repeat steps S11–S16. When the acceleration period Ta is completed and the step number i reaches the number of steps Na, the control flow exits the operation loop at step S17 and proceeds to step S18. The waveform of the detection signal S during the acceleration period and the switching state of the phase data are shown in FIG. 6(a). The acceleration period Ta is completed at time t3.

In step S18, a determination is made whether the number of steps Nc for the constant speed period Tc is zero. When the number of steps Nc is zero, the operation jumps to step S31 for deceleration period Td. If not, the sequence of operation enters the first step S20 in the constant speed period Tc.

In step S20, step number i is set to one. In the next step S21, for the constant speed period Tc, a predetermined timing data Tf is read from the schedule storage means 40 and is entered in T. The loop operation in steps S22–S27 is similar to steps S12–S17. The constant speed drive of the stepping motor during this loop operation is shown in FIG. 6(b). When the constant speed period Tc is completed at time t4 and step number i has reached the number of steps Nc, the control sequence exits the loop at step S27 and proceeds to step S30 for the deceleration period.

In the first step S30 within the deceleration period Td, the step number i is set to one. The operation loop of steps S3114 S37 is the same as steps Sll–S17, except for setting the initial timing data for the deceleration period Td which will be described by referring to FIG. 6(c).

As shown in FIG. 6(c), the deceleration period Td starts with the completion at time t4 of the constant speed period Tc. Following that, a timer operation based on the first timing data Tl starts at time t5 when the detection signal S changes state for the first time. The first timing data Tl is longer than the subsequent timing data so that the detection signal S changes state at time t6 before the timer operation is completed. During this timer operation, however, the change in the state of detection signal S is ignored. In other words, in this embodiment, the stepping motor gets ahead during the timer operation with the first timing data Tl. The phase data is, therefore, delayed one step from the normal value when the phase data is switched at the completion of the timer operation. Thus, it is possible with this arrangement to apply a braking force to the stepping motor to minimize deviation from the driving schedule.

The subsequent operations within the deceleration period Td are essentially the same as previous operations. When the operations are completed at time t7 and the step number i reaches the predetermined number of steps Nd, the sequence of operation proceeds from step S37 to the step S40 for the stop operation period Ts.

The stop operation period Ts is also shown in FIG. 6(c). During this period, the speed of the stepping motor is very low so that, in this embodiment, the stepping motor is brought to a complete stop at time t8. The detection signal S is changed twice after completion of the deceleration period by switching the phase data at the same time as the last change at time t8. Steps S40–S45 in FIG. 5 show this operation.

In the first step S40, step number i is set to one. Steps S41 and step S42 wait for a change in the state of the detection signal, in step S43, the operations of step S41–S44 are repeated until the step number reaches two. When the detection signal S changes its state twice, the stepping motor is brought to a stop in step S45 and held there by outputting a phase data Dj corresponding to the desired stopping position.

As described above, during the acceleration period, the motion of the movable piece is introduced according to a drive schedule based on timing data that is decreased sequentially. The phase data is advanced by one step ahead of the actual position of the movable piece of the stepping motor to promote acceleration. During the deceleration period, the movement of the movable piece is constrained according to a drive schedule based on timing data that is increased sequentially. During this period, the phase data is delayed by one step behind the actual position of the movable piece to promote deceleration. In the stop operation period, by waiting for a sufficiently low speed of the movable piece, it is possible to bring the movable piece to a stop at a desired position and hold it there without overshooting or oscillation, by providing a final phase data that corresponds to the desired stopping position, from the timing designating means to the drive circuit that is matched with the movement of the movable piece. The stopping operation takes time, but it is possible to decrease the time required until the final stop of the movable piece compared with the case where the movable piece is brought to a stop while oscillating around a desired position.

The present invention can be embodied in various modes without being limited to the present embodiment. The specific construction of the position detection signal means and the detection signal, for example, may take different forms. The timing data within the schedule storage means should correspond to such conditions as the characteristics of the stepping motor, inertia of the load, and the desired driving schedule. The specific operation of the timing designating means can also be developed in various modes and sequence of steps within the scope of the present invention.

In the present invention, as described above, in driving a polyphase stepping motor according to a predetermined schedule, via a drive circuit that supplies a plurality of phase currents to the motor, the position of the movable piece of the stepping motor corresponding to the reference vectors in a vector diagram formed by a plurality of phase currents of the stepping motor is read by the position detection means. The timing for switching the phase currents is set based on the drive schedule for each position of the movable piece represented by the detection signal from the position detecting means, and the timing data is stored in the schedule storage means. The phase currents supplied to the drive circuit are switched by the timing designating means synchronized with the detection signal according to the timing data stored in the schedule storage means. It is possible then to switch the phase currents supplied to the stepping motor according to the actual movement of the stepping motor while based on a predetermined drive schedule By so doing, it is further possible to bring the movable piece to a smooth stop at a desired position in a short time without overshooting or oscillation around the desired stopping position.

Such features of the present invention are particularly useful in moving or controlling the position of the read/write head of a disk storage drive by a stepping motor. Thus, it is possible to reduce the access time for the data by saving the time required for precisely positioning the read/write head. The schedule storage means and the timing designating means of the present invention may be incorporated in a programmed microcomputer as data and a program, respectively. The present invention can therefore be carried out by just adding position detecting means. By incorporating the position detecting means in the microcomputer, it is further possible to accomplish the goals at the invention with very little addition to the manufacturing cost.

What is claimed is:

1. A driving device for driving a polyphase stepping motor in accordance with a prescribed drive schedule via a drive circuit that supplies a plurality of phase currents to the stepping motor, said driving device comprising;
    position detecting means for generating a detection signal representing the actual position of a movable piece of the stepping motor;
    schedule storage means for storing the drive schedule in the form of timing data for switching the phase currents for each position of the movable piece relative to the detection signal of the position detecting means; and
    timing designating means, responsive to receipt of the detection signal, for causing the drive circuit to switch the phase currents supplied to the stepping motor according to the timing data.

2. The driving device of claim 1, wherein said position detecting means includes an encoder mechanically coupled to the movable piece of the stepping motor.

3. The driving device of claim 1, wherein said position detecting means includes sensor means for detecting a magnetic pole position of the movable piece of the stepping motor.

4. The driving device of claim 1, wherein the timing data for switching the phase currents successively decreases during acceleration of the stepping motor and successively increases during deceleration of the stepping motor.

5. The driving device of claim 1, wherein the timing designating means includes means for outputting to the drive circuit phase data corresponding to a position of the movable piece of the stepping motor that is two steps ahead of the current position of the movable piece during acceleration of the stepping motor, and for outputting to the drive circuit phase data corresponding to a position of the movable piece of the stepping motor that is one step behind the current position of the movable piece during deceleration of the stepping motor.

6. The driving device of claim 1, wherein said timing designating means includes a programmed microcomputer.

7. A driving device for driving a polyphase stepping motor in accordance with a prescribed drive schedule via a drive circuit that supplies a plurality of phase currents to the stepping motor, said driving device comprising:
    position detecting means for generating a detection signal representing the actual position of a movable piece of the stepping motor;
    schedule storage means for storing the drive schedule in the form of timing data for switching the phase currents for each position of the movable piece relative to the detection signal of the position detecting means; and
    timing designating means, responsive to receipt of the detection signal, for causing the drive circuit to switch the phase currents supplied to the stepping motor according to the timing data, wherein the timing designating means includes means for outputting to the drive circuit phase data corresponding to a position of the movable piece of the stepping motor that is at least one step ahead of the current position of the movable piece during acceleration of the stepping motor, and for outputting to the drive circuit phase data corresponding to a position of the movable piece of the stepping motor that is at least one step behind the current position of the movable piece during deceleration of the stepping motor.

* * * * *